(12) United States Patent
Tecza et al.

(10) Patent No.: US 8,308,364 B2
(45) Date of Patent: Nov. 13, 2012

(54) AUXILIARY BEARING SYSTEM FOR MAGNETICALLY SUPPORTED ROTOR SYSTEM

(75) Inventors: Joseph A. Tecza, Scio, NY (US); William C. Maier, Almond, NY (US)

(73) Assignee: Dresser-Rand Company, Olean, NY (US)

(*) Notice: Subject to any disclaimer, the term of this patent is extended or adjusted under 35 U.S.C. 154(b) by 49 days.

(21) Appl. No.: 12/900,629

(22) Filed: Oct. 8, 2010

(65) Prior Publication Data

US 2011/0085752 A1   Apr. 14, 2011

Related U.S. Application Data

(60) Provisional application No. 61/250,273, filed on Oct. 9, 2009.

(51) Int. Cl.
*F16C 21/00* (2006.01)
*F16C 27/00* (2006.01)
(52) U.S. Cl. .......................................... 384/99; 384/102
(58) Field of Classification Search ................... 384/99, 384/101, 102, 624, 626; 310/90, 90.5
See application file for complete search history.

(56) References Cited

U.S. PATENT DOCUMENTS

| | | |
|---|---|---|
| 2,231,323 A | 2/1941 | Cawood |
| 3,295,801 A | 1/1967 | McDowall et al. |
| 3,630,586 A | 12/1971 | Pitner |
| 3,683,734 A | 8/1972 | Claussen |
| 3,827,337 A | 8/1974 | Pruvot |
| 3,947,153 A | 3/1976 | Matthias et al. |
| 4,063,786 A | 12/1977 | Rall |
| 4,128,280 A | 12/1978 | Purtschert |
| 4,141,604 A | 2/1979 | Haberman et al. |
| 4,213,661 A | 7/1980 | Marmol |
| 4,460,283 A | 7/1984 | Yoshioka et al. |
| 4,526,483 A | 7/1985 | Hishikawa et al. |
| 4,542,994 A | 9/1985 | Mohsin |
| 4,545,586 A | 10/1985 | Von Pragenau |
| 4,553,855 A | 11/1985 | De Choudhury |
| 4,597,676 A | 7/1986 | Vohr et al. |
| 4,657,414 A | 4/1987 | Stella |
| 4,683,111 A | 7/1987 | Helm et al. |
| 4,827,169 A | 5/1989 | Habermann |
| 4,872,767 A | 10/1989 | Knapp |
| 4,929,158 A | 5/1990 | Girault |
| 4,982,126 A | 1/1991 | Jolivet et al. |
| 5,021,697 A | 6/1991 | Kralick |
| 5,083,053 A | 1/1992 | New |
| 5,126,612 A | 6/1992 | Girault |

(Continued)

FOREIGN PATENT DOCUMENTS

JP    08-082397 A    3/1996
(Continued)

OTHER PUBLICATIONS

PCT/US2010/051922 International Search Report and Written Opinion dated Jun. 30, 2011 (8 pages).

(Continued)

*Primary Examiner* — Phillip A Johnson
(74) *Attorney, Agent, or Firm* — Edmond & Nolte, PC

(57) ABSTRACT

An auxiliary bearing system for a magnetically supported rotor system according to which the auxiliary bearing system includes at least two mounting pad assemblies having compliantly mounted body members.

20 Claims, 13 Drawing Sheets

U.S. PATENT DOCUMENTS

| | | | |
|---|---|---|---|
| 5,231,323 A | 7/1993 | New |
| 5,272,403 A | 12/1993 | New |
| 5,341,527 A | 8/1994 | Schmidt et al. |
| 5,347,190 A | 9/1994 | Lewis et al. |
| 5,355,040 A | 10/1994 | New |
| 5,425,584 A | 6/1995 | Ide |
| 5,521,448 A | 5/1996 | Tecza et al. |
| 5,547,287 A | 8/1996 | Zeidan |
| 5,616,976 A | 4/1997 | Fremerey et al. |
| 5,630,881 A | 5/1997 | Ogure et al. |
| 5,693,994 A | 12/1997 | New |
| 5,714,818 A | 2/1998 | Eakman et al. |
| 5,749,700 A | 5/1998 | Henry et al. |
| 5,752,774 A | 5/1998 | Heshmat et al. |
| 5,803,612 A | 9/1998 | Battig |
| 5,810,485 A | 9/1998 | Dublin, Jr. et al. |
| 5,977,677 A | 11/1999 | Henry et al. |
| 6,036,435 A | 3/2000 | Oklejas |
| 6,078,120 A | 6/2000 | Casaro et al. |
| 6,155,720 A | 12/2000 | Battig |
| 6,194,801 B1 | 2/2001 | Goransson |
| 6,196,809 B1 | 3/2001 | Takahashi et al. |
| 6,244,749 B1 | 6/2001 | Nakagawa et al. |
| 6,309,174 B1 | 10/2001 | Oklejas, Jr. et al. |
| 6,310,414 B1 | 10/2001 | Agahi et al. |
| 6,353,273 B1 | 3/2002 | Heshmat et al. |
| 6,402,385 B1 | 6/2002 | Hayakawa et al. |
| 6,617,733 B1 * | 9/2003 | Yamauchi et al. ........... 310/90.5 |
| 6,770,993 B1 | 8/2004 | Heshmat et al. |
| 6,846,158 B2 | 1/2005 | Hull |
| 6,987,339 B2 | 1/2006 | Adams et al. |
| 7,240,583 B2 | 7/2007 | Wingett et al. |
| 7,264,430 B2 | 9/2007 | Bischof et al. |
| 7,367,713 B2 | 5/2008 | Swann et al. |
| 7,429,811 B2 | 9/2008 | Palazzolo et al. |
| 7,694,540 B2 | 4/2010 | Ishida et al. |
| 7,836,601 B2 | 11/2010 | El-Shafei |
| 2004/0047526 A1 | 3/2004 | Dewachter |
| 2004/0189124 A1 | 9/2004 | Baudelocque et al. |
| 2006/0204153 A1 | 9/2006 | Alam et al. |
| 2007/0036476 A1 | 2/2007 | Lane et al. |
| 2009/0302698 A1 | 12/2009 | Menz et al. |
| 2010/0021095 A1 | 1/2010 | Maier |
| 2011/0052109 A1 | 3/2011 | Tecza et al. |

FOREIGN PATENT DOCUMENTS

| | | |
|---|---|---|
| JP | 2001-124062 A | 5/2001 |
| KR | 10-1989-0010437 A | 8/1989 |
| KR | 10-0207986 B1 | 7/1999 |
| WO | 91-17367 | 11/1991 |
| WO | 01-57408 A1 | 8/2001 |
| WO | 2006-098806 A1 | 9/2006 |
| WO | 2007-047976 A1 | 4/2007 |
| WO | 2011-044423 A1 | 4/2011 |
| WO | 2011-044428 A1 | 4/2011 |
| WO | 2011-044430 A1 | 4/2011 |
| WO | 2011-044432 A1 | 4/2011 |
| WO | 2011-020746 A1 | 7/2011 |

OTHER PUBLICATIONS

PCT/US2010/051927 International Search Report and Written Opinion dated Jun. 30, 2011 (8 pages).

Tecza and Walton, "A Chambered Porous Damper for Rotor Vibration Control: Part I—Concept Development" in The American Society of Mechanical Engineers, NY, 7 pages.

Walton and Martin, "A Chambered Porous Damper for Rotor Vibration Control: Part II—Imbalance Response and Bladeloss Simulation" in The American Society of Mechanical Engineers, NY, 7 pages.

PCT/US2010/051930 International Search Report and Written Opinion dated Jun. 30, 2011 (8 pages).

PCT/US2010/051932 International Search Report and Written Opinion dated Jun. 30, 2011 (8 pages).

PCT/US2010/020746 International Search Report and Written Opinion dated Sep. 23, 2011 (8 pages).

"Auxiliary Bearings in Vertically Oriented Machines on Magnetic Bearings," EPRI, Palo Alto, CA: 2001.

Extended European search report for EP 06817242.8 dated Aug. 7, 2009, 3 pages.

Supplementary European search report for EP 06817242.8 dated Aug. 25, 2009, 1 page.

International Preliminary Report on Patentability for PCT/US2006/041127 dated Apr. 23, 2008, 4 pages.

Written Opinion of the International Searching Authority for PCT/US2006/041127 dated Mar. 19, 2007, 3 pages.

* cited by examiner

AUXILIARY BEARING SYSTEM FOR MAGNETICALLY SUPPORTED ROTOR SYSTEM

CROSS REFERENCE TO RELATED APPLICATIONS

This application claims priority to U.S. Patent Application Ser. No. 61/250,273, which was filed Oct. 9, 2009. This priority application is hereby incorporated by reference in its entirety into the present application, to the extent that it is not inconsistent with the present application.

BACKGROUND

This disclosure relates in general to auxiliary bearing systems, and in particular to an auxiliary bearing system for a magnetically supported rotor system.

In turbomachine systems, if a primary bearing (such as a magnetic bearing) fails, the shaft of the turbomachine will generally fall or drop onto the adjacent mechanical surfaces. This drop often causes substantial damage to the shaft and/or the surrounding components. In turbomachine systems that include an auxiliary bearing, the shaft may drop onto the auxiliary bearing without damaging the shaft or surrounding components.

An auxiliary bearing system is oftentimes subject to extreme accelerations and/or forces during the drop of a shaft operating at high speed, thereby limiting the life of the auxiliary bearing system. To combat these extreme accelerations and/or forces, an auxiliary bearing system may include an inertia ring that is coupled to the shaft. When the primary bearing fails, the inertia ring engages one or more generally stationary surfaces having sacrificial frictional material, thereby regulating the slowdown of the inertia ring. However, potential problems may arise during the operation of a typical inertia ring and its engagement with one or more generally stationary surfaces having sacrificial frictional material. For example, the surfaces having the stationary frictional material may not be able to accommodate the applied load of the shaft, and/or distribute the load among the surfaces. Therefore, what is needed is a system or configuration that overcomes these problems.

SUMMARY

Embodiments of the disclosure may provide an auxiliary bearing system, including at least two mounting pad assemblies may be provided, each mounting pad assembly including a body member compliantly mounted to a casing and permitted to move relative to the casing and the respective body members of other mounting pad assemblies. An inertia ring may be coupled to the shaft, and the inertia ring may engage one or more of the mounting pad assemblies when the shaft is supported by the auxiliary bearing system.

Embodiments of the disclosure may further provide a method of supporting a shaft. The method includes coupling an inertia ring to the shaft, wherein the shaft is at least partially disposed in a casing; compliantly mounting at least two body members to the casing so that each of the body members is permitted to move relative to the casing and the other body members; supporting the shaft with a primary bearing system; and engaging the inertia ring with one or more of the compliantly-mounted body members when the primary bearing system fails.

Embodiments of the disclosure may further provide a rotor system including a shaft and a primary bearing system that supports the shaft during normal operating conditions. An auxiliary bearing system may support the shaft when the primary bearing system fails. The auxiliary bearing system may include an inner ring of a roller element bearing coupled to the shaft, and an outer ring of the roller element bearing disposed radially outward from the inner ring. An inertia ring may be coupled to the outer ring. At least two mounting pad assemblies may be disposed radially outward from the inertia ring, wherein a radial gap is defined between the inertia ring and an inner surface of each of the mounting pad assemblies when the primary bearing system is supporting the shaft. Each of the mounting pad assemblies may be compliantly mounted to a casing.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
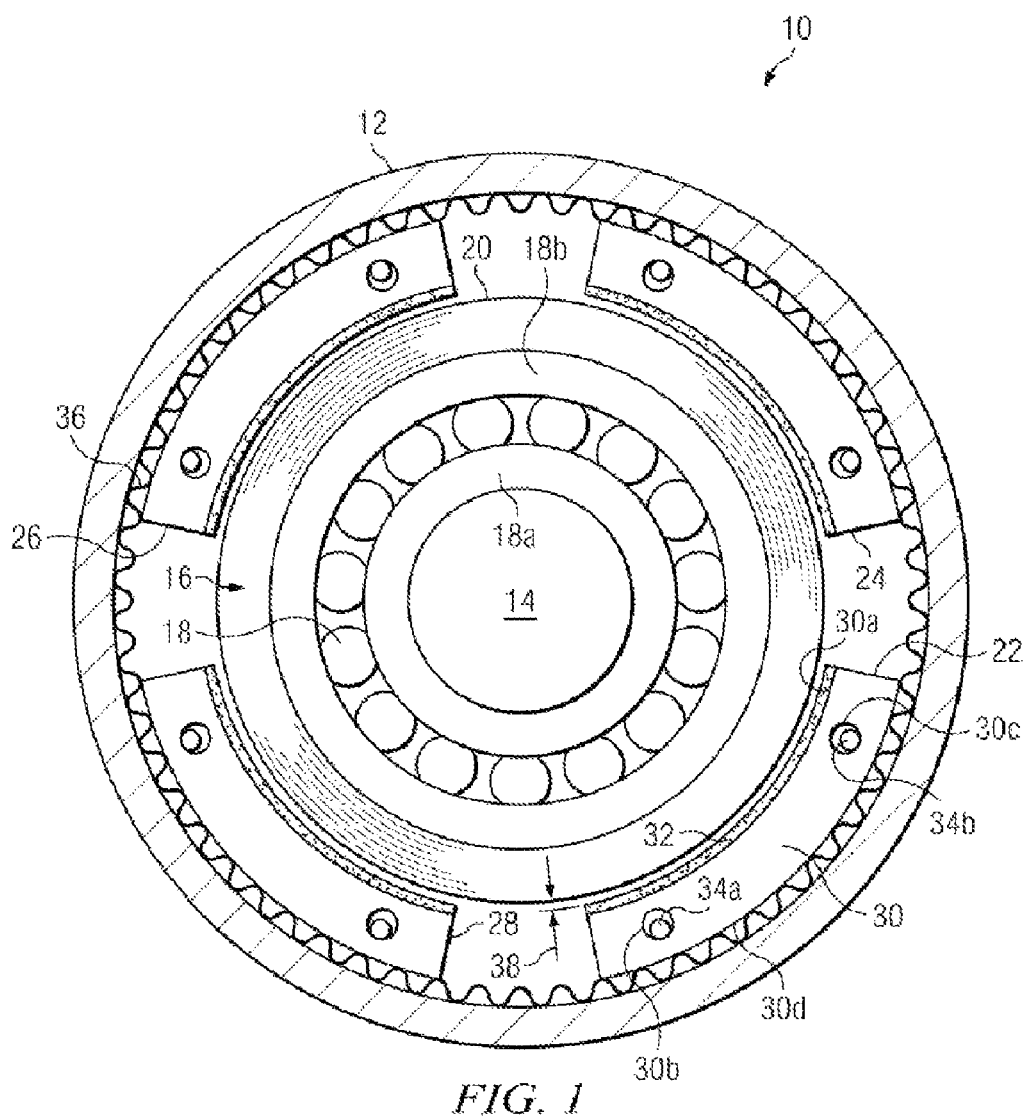
FIG. 1 is a sectional view of a rotor system according to an exemplary embodiment, the rotor system including a shaft and an auxiliary bearing system.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

In an exemplary embodiment, as illustrated in FIG. 1, a rotor system is generally referred to by the reference numeral 10 and includes a casing 12 and a shaft 14 at least partially disposed therein. The shaft 14 is normally supported by one or more active magnetic bearing systems (not shown) positioned at one or more axially-spaced locations along the shaft 14 including, but not limited to, opposing end portions of the shaft 14. In several exemplary embodiments, the rotor system 10 includes, or is part of, a turbomachine such as, for example, a compressor, motor, generator or turbine. The rotor system 10 further includes an auxiliary bearing system 16, which includes a roller element bearing 18 having an inner bearing ring 18a through which the shaft 14 extends, and an outer bearing ring 18b. The inner bearing ring 18a is coupled to the shaft 14. An inertia ring 20 is coupled to the outer bearing ring 18b.

The auxiliary bearing system 16 further includes circumferentially-spaced mounting pad assemblies 22, 24, 26 and 28. The mounting pad assembly 22 includes a body member 30 defining an inner surface 30a on which a sacrificial friction material 32 is disposed. In an exemplary embodiment, the inner surface 30a is coated with the friction material 32. Circumferentially-spaced openings 30b and 30c are formed in each of the opposing axial end portions of the body member 30. In an exemplary embodiment, the openings 30b and 30c are through openings, resulting in a total of at least two openings formed in the body member 30; in an exemplary embodiment, the openings 30b and 30c at each axial end portion are blind openings, resulting in a total of at least four openings formed in the body member 30. Axially-extending pins 34a and 34b extend within the openings 30b and 30c, respectively, and are coupled to the casing 12 at respective locations outside of the body member 30. The openings 30b and 30c are oversized with respect to the pins 34a and 34b, respectively, permitting relative movement between the body member 30 and the casing 12. In an exemplary embodiment, the pins 34a and 34b are coupled to the casing 12 by mounting the pins 34a and 34b in a support structure on either axial side of the auxiliary bearing system 16. If the openings 30b and 30c are through openings, the pins 34a and 34b extend through the body member 30, resulting in a total of at least two pins. If the openings 30b and 30c are blind openings, the pins 34a and 34b extend into only a portion of the body member 30 at one axial end portion and pins substantially identical to the pins 34a and 34b extend into only a portion of the body member 30 at the other axial end portion.

An outer surface 30d of the body member 30, which is radially offset from the inner surface 30a, is engaged with a portion of a compliant member 36, which is engaged with, and extends circumferentially around, the inside surface of the casing 12. The compliant member 36 is configured to provide stiffness, damping and a range of angular compliance. In an exemplary embodiment, the compliant member 36 is a formed metal strip or sheet. In an exemplary embodiment, the compliant member 36 is or includes a bump foil, a Borelli ribbon, a tolerance ring segment, knitted metal mesh, an elastomeric support arrangement, parallel flexures, curved beams, and/or any combination thereof. In several exemplary embodiments, the Borelli ribbon may include a compliant ribbon-shaped structure, and the bump foil may include a foil having a series of uniform, axially-extending corrugations or bumps. In an exemplary embodiment, the compliant member 36 includes one or more embodiments disclosed in U.S. Pat. No. 4,223,958 to Gray, the entire disclosure of which is incorporated herein by reference to the extent the incorporated disclosure is not inconsistent with the present disclosure. In an exemplary embodiment, instead of extending circumferentially around the inside surface of the casing 12, the compliant member 36 is divided into a plurality of arcuate segments, each of which is engaged with the inside surface of the casing 12 and positioned between a respective body member of one of the mounting pad assemblies 22, 24, 26 and 28. The engagement of the outer surface 30d with the compliant member 36 provides a compliant mount for the body member 30.

As shown in FIG. 1, the body member 30 is biased away from the inside surface of the casing 12 by the compliant member 36 and held in place by the pins 34a and 34b, thereby preloading the body member 30 against the compliant member 36 and holding the body member 30 (and thus the friction material 32) radially away from the inertia ring 20 under conditions to be described below. The openings 30b and 30c are oversized to allow angular compliance, to prevent the body member 30 from rotating, and to permit movement of the body member 30 relative to the casing 12 and the other mounting pad assemblies 24, 26 and 28.

Each of the mounting pad assemblies 24, 26 and 28 is substantially identical to the mounting pad assembly 22, and therefore the mounting pad assemblies 24, 26 and 28 will not be described in further detail. The components of each of the mounting pad assemblies 24, 26 and 28 are given the same reference numerals as the corresponding components of the mounting pad assembly 22.

In several exemplary embodiments, in addition to the mounting pad assemblies 22, 24, 26 and 28, the auxiliary bearing system 16 may include one or more other mounting pad assemblies substantially identical to the mounting pad assembly 22. In several exemplary embodiments, one or more of the mounting pad assemblies 22, 24, 26 and 28 may be omitted from the auxiliary bearing system 16. In an exemplary embodiment, the auxiliary bearing system 16 may include only two of the mounting pad assemblies 22, 24, 26 and 28.

During normal operation of the rotor system 10, that is, when the active magnetic bearings systems are supporting the shaft 14, the shaft 14 rotates and a radial clearance or gap 38 is defined between the inertia ring 20 and the friction material 32. The shaft 14 is levitated, relative to the casing 12 and the mounting pad assemblies 22, 24, 26 and 28, by the one or more active magnetic bearing systems, and the shaft 14, the roller element bearing 18 including the rings 18a and 18b, and the inertia ring 20 all rotate relative to the casing 12 and the mounting pad assemblies 22, 24, 26 and 28, all of which are generally stationary. The auxiliary bearing system 16 does not support the shaft 14 during the normal operation of the rotor system 10. However, since the inner ring 18a of the roller element bearing 18 is coupled to the shaft 14, the roller element bearing 18 and the inertia ring 20 rotate or spin in place along with the shaft 14 during the normal operation of the rotor system 10.

When one or more of the magnetic bearing systems—which support the shaft 14 during normal operation of the rotor system 10—fail, the shaft 14 delevitates so that the inertia ring 20 engages or drops onto one or both of the mounting pad assemblies 22 and 28, at which point the auxiliary bearing system 16 begins to at least partially support the spinning shaft 14, with the roller element bearing 18 being subjected to, and accommodating, at least a radial load. The inertia ring 20 increases the mass of the outer bearing ring 18b and therefore slows the rate of deceleration of the outer bearing ring 18b during the drop event. Upon engagement with the mounting pad assemblies 22 and/or 28, the inertia ring 20 contacts the friction material 32 of the mounting pad assembly 22 and/or the friction material 32 of the assembly 28, which friction material(s) regulate the slowdown of the inertia ring 20 and prevent damage to the engaging surfaces of the inertia ring 20 and the respective body members 30. Due to the compliant mounting of the respective body members 30, the mounting pad assemblies 22 and/or 28 absorb impact loads due to the drop of the shaft 14 and provide prescribed amounts of stiffness and damping to the auxiliary bearing system 16, thereby facilitating vibration control of the shaft 14 when traversing critical speeds during coastdown. The controlled deceleration of the components of the auxiliary bearing system 16, including the roller element bearing 18 and the inertia ring 20, allow the auxiliary bearing system 16 to tolerate an increased number of drop events of the shaft 14. Moreover, there are no unlubricated moving contacts once the transient motion associated with a drop event has ceased. In an exemplary embodiment, if the shaft 14 delevitates and engages two or more of the mounting pad assemblies 22, 24, 26 and 28, the shaft 14 is supported at two or more discrete points, thereby minimizing any tendency for the shaft 14 to whirl.

During the engagement of the inertia ring 20 with the mounting pad assembly 22, at least the compliant mount provided by the engagement of the body member 30 with the compliant member 36, and/or the oversized openings 30b and 30c, allow the body member 30 to move and/or pivot to best accommodate the applied load. For example, the body member 30 or a portion thereof may move by pivoting about, for example, an axis that is generally parallel to the shaft, and/or translating radially, axially, circumferentially, and/or any combination thereof. Similarly, in addition to the engagement of the inertia ring 20 with the mounting pad assembly 22, the corresponding compliant mount(s) provided by one or more of the mounting pad assemblies 24, 26 and 28, and the corresponding pairs of oversized openings 30b and 30c, allow the corresponding body members 30 to move by pivoting and/or translating to best accommodate the applied load, and to distribute the load among the mounting pad assembly 22 and the one or more of the mounting pad assemblies 24, 26 and 28. As a result, two or more of the mounting pad assemblies 22, 24, 26 and 28 cradle the mass of the inertia ring 22 and share the load.

Since the respective body members 30 of the mounting pad assemblies 22, 24, 26 and 28 are compliantly mounted to the casing 12 and the body members 30 have some degree of movement to better support the load(s) on them, the mounting pad assemblies 22, 24, 26 and 28 support the shaft 14 in a stable position if, as a result of the failure of one or more of the magnetic bearing systems and the delevitation of the shaft 14, one or more loads are in line with one or more of the respective body members 30 and/or if one or more loads are between adjacent ones of the respective body members 30.

Figure 2:
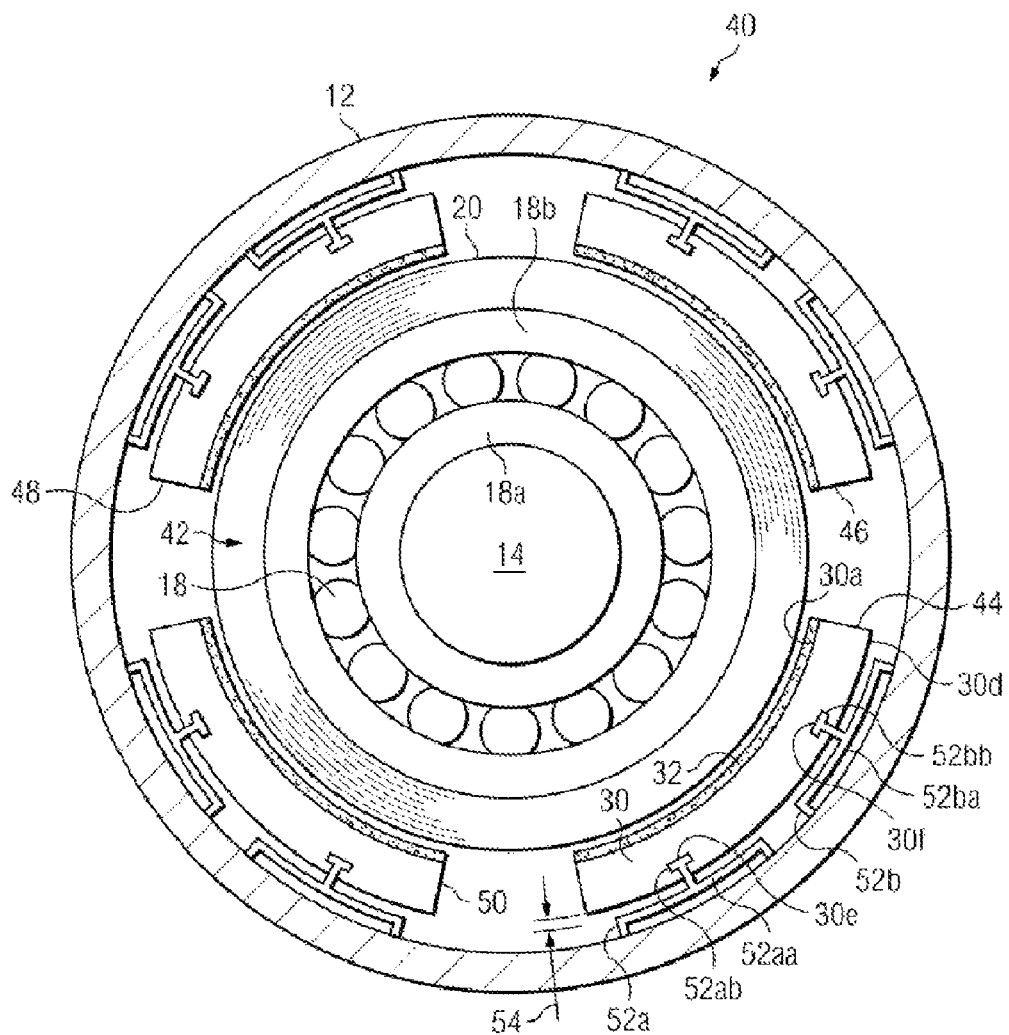
FIG. 2 is a sectional view of another rotor system according to an exemplary embodiment, the rotor system including a shaft and another auxiliary bearing system.

In an exemplary embodiment, as illustrated in FIG. 2 with continuing reference to FIG. 1, a rotor system is generally referred to by the reference numeral 40 and includes an auxiliary bearing system 42, which contains several parts of the auxiliary bearing system 16, which are given the same reference numerals. The auxiliary bearing system 42 includes circumferentially-spaced mounting pad assemblies 44, 46, 48 and 50. The mounting pad assembly 44 is substantially similar to the mounting pad assembly 22, except that the compliant member 36, the openings 30b and 30c, and the pins 34a and 34b, are omitted in favor of T-shaped slots 30e and 30f and curved beam supports 52a and 52b, which are coupled to the inside wall of the casing 12. The curved beam supports 52a and 52b include bases 52aa and 52ba, from which T-shaped protrusions 52ab and 52bb, respectively, extend radially inward. The slots 30e and 30f are formed in the surface 30d of the body member 30, and the T-shaped protrusions 52ab and 52bb extend within the slots 30e and 30f, respectively, thereby engaging the body member 30 and thus compliantly mounting the body member 30. A gap 54 is defined between the body member 30 and bases 52aa and 52ba.

Each of the mounting pad assemblies 46, 48 and 50 is substantially identical to the mounting pad assembly 44 and therefore the mounting pad assemblies 46, 48 and 50 will not be described in further detail. The components of each of the mounting pad assemblies 46, 48 and 50 are given the same reference numerals as the corresponding components of the mounting pad assembly 44.

In several exemplary embodiments, in addition to the mounting pad assemblies 44, 46, 48 and 50, the auxiliary bearing system 42 may include one or more other mounting pad assemblies substantially identical to the mounting pad assembly 44. In several exemplary embodiments, one or more of the mounting pad assemblies 44, 46, 48 and 50 may be omitted from the auxiliary bearing system 42. In an exemplary embodiment, the auxiliary bearing system 42 may include only two of the mounting pad assemblies 44, 46, 48 and 50.

The operation of the rotor system 40, including the operation of its auxiliary bearing system 42, is similar to the above-described operation of the rotor system 10, including the above-described operation of its auxiliary bearing system 16, and therefore the operation of the rotor system 40 and the auxiliary bearing system 42 will not be described in detail. At least the compliant mounts provided by the respective engagements between the body members 30 and the corresponding curved beams 52a and 52b, and/or the respective gaps 54, allow the body members 30 of the auxiliary bearing system 42 to move and/or pivot to best accommodate and/or distribute the applied load when one or more of the magnetic bearing systems normally supporting the rotating shaft 14 fail.

Figure 3:
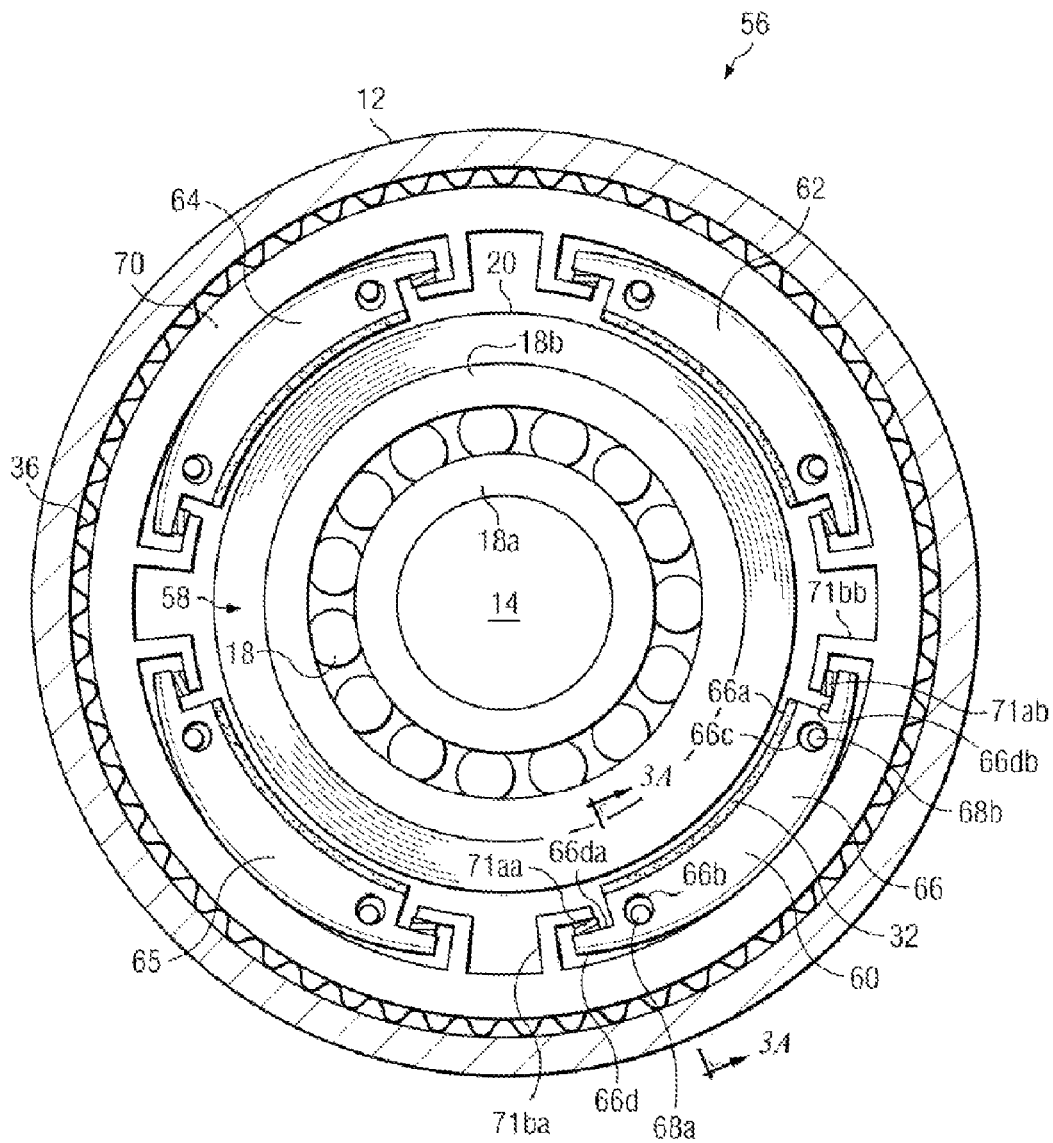
FIG. 3 is a sectional view of a yet another rotor system according to an exemplary embodiment, the rotor system including a shaft and yet another auxiliary bearing system.
Figure 3A:
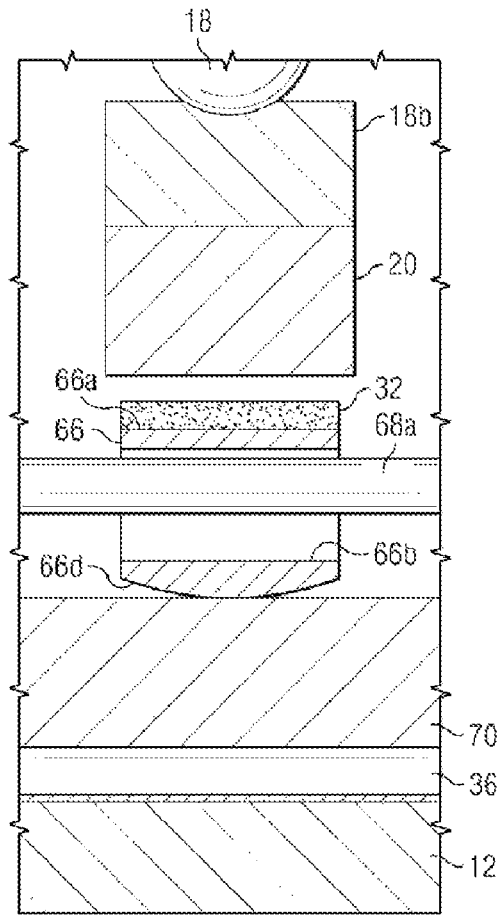
FIG. 3A is a partial sectional view of the rotor system of FIG. 3 taken along line 3A-3A.

In an exemplary embodiment, as illustrated in FIGS. 3 and 3A with continuing reference to FIGS. 1 and 2, a rotor system is generally referred to by the reference numeral 56 and includes the casing 12, the shaft 14 and an auxiliary bearing system 58, which, in turn, includes the roller element bearing 18, the inertia ring 20, and circumferentially spaced mounting pad assemblies 60, 62, 64 and 65. The mounting pad assembly 60 includes an arcuate body member 66 defining an inner surface 66a on which the friction material 32 is disposed. In an exemplary embodiment, the inner surface 66a is coated with the friction material 32. Circumferentially-spaced openings 66b and 66c are formed in each of the opposing axial end portions of the body member 66. Axially-extending pins 68a and 68b extend through the openings 66b and 66c, respectively, and are coupled to the casing 12 at respective locations outside of the body member 66. In an exemplary embodiment, the pins 68a and 68b are coupled to the casing 12 by mounting the pins 68a and 68b in a support structure on either axial side of the auxiliary bearing system 58. The openings 66b and 66c are oversized with respect to the pins 68a and 68b, respectively, permitting relative movement between the body member 66 and, for example, the casing 12 and the mounting assemblies 62, 64 and 65.

The body member 66 further defines an outer surface 66d, which is radially offset from the inner surface 66a, and which includes a radius of curvature in the circumferential direction (as viewed in FIG. 3) that is less than the radius of curvature of the surface 66a. The outer surface 66d also includes a radius of curvature in the axial direction (as viewed in FIG. 3A)—this may be referred to as a "double-tilt" configuration. The outer surface 66d of the body member 66 is engaged with a portion of a circumferentially-extending casing or housing 70, which, in turn, is engaged with the compliant member 36 and thus is compliantly mounted. Due to the curvature of the outer surface 66d, the body member 66 is able to rock on the inside surface of the housing 70. In an exemplary embodiment, the outer surface 66d includes a radius of curvature in the circumferential direction (as viewed in FIG. 3), but the outer surface 66d does not include a radius of curvature in the axial direction. This may be referred to as a "single-tilt" configuration. Axially-extending shoulders 66da and 66db are formed on opposing circumferential end portions of the body member 66. Hold-down springs 71aa and 71ab are disposed on the shoulders 66da and 66db, respectively. In an exemplary embodiment, each of the hold-down springs 71aa and 71ab includes a wave spring. Generally L-shaped protrusions 71ba and 71bb extend from the inside surface of the housing 70, and the smaller legs of the protrusions 71ba and 71bb extend over, and engage, the hold-down springs 71aa and 71ab, respectively, thereby providing a radial retention mechanism or hold-down arrangement.

Each of the mounting pad assemblies 62, 64 and 65 is substantially identical to the mounting pad assembly 60 and therefore the mounting pad assemblies 62, 64 and 65 will not be described in further detail. The components of each of the mounting pad assemblies 62, 64 and 65 are given the same reference numerals as the corresponding components of the mounting pad assembly 60. The engagements between the L-shaped protrusions 71ba and 71bb and the hold-down springs 71aa and 71ab, respectively, keep the respective body members 66 of the mounting pad assemblies 62 and 64 from falling down, as viewed in FIG. 3.

In several exemplary embodiments, in addition to the mounting pad assemblies 60, 62, 64 and 65, the auxiliary bearing system 58 may include one or more other mounting pad assemblies substantially identical to the mounting pad assembly 60. In several exemplary embodiments, one or more of the mounting pad assemblies 60, 62, 64 and 65 may be omitted from the auxiliary bearing system 58. In an exemplary embodiment, the auxiliary bearing system 58 may include only two of the mounting pad assemblies 60, 62, 64 and 65.

The operation of the rotor system 56, including the operation of its auxiliary bearing system 58, is similar to the above-described operation of the rotor system 10, including the above-described operation of its auxiliary bearing system 16, and therefore the operation of the rotor system 56 and the auxiliary bearing system 58 will not be described in detail. At least the compliant mount provided by the engagement between the housing 70 and the compliant member 36, and/or the rocking ability of the respective body members 66, allow the body members 66 of the auxiliary bearing system 58 to move and/or pivot to best accommodate and/or distribute the applied load when one or more of the magnetic bearing systems normally supporting the rotating shaft 14 fail.

Figure 4:
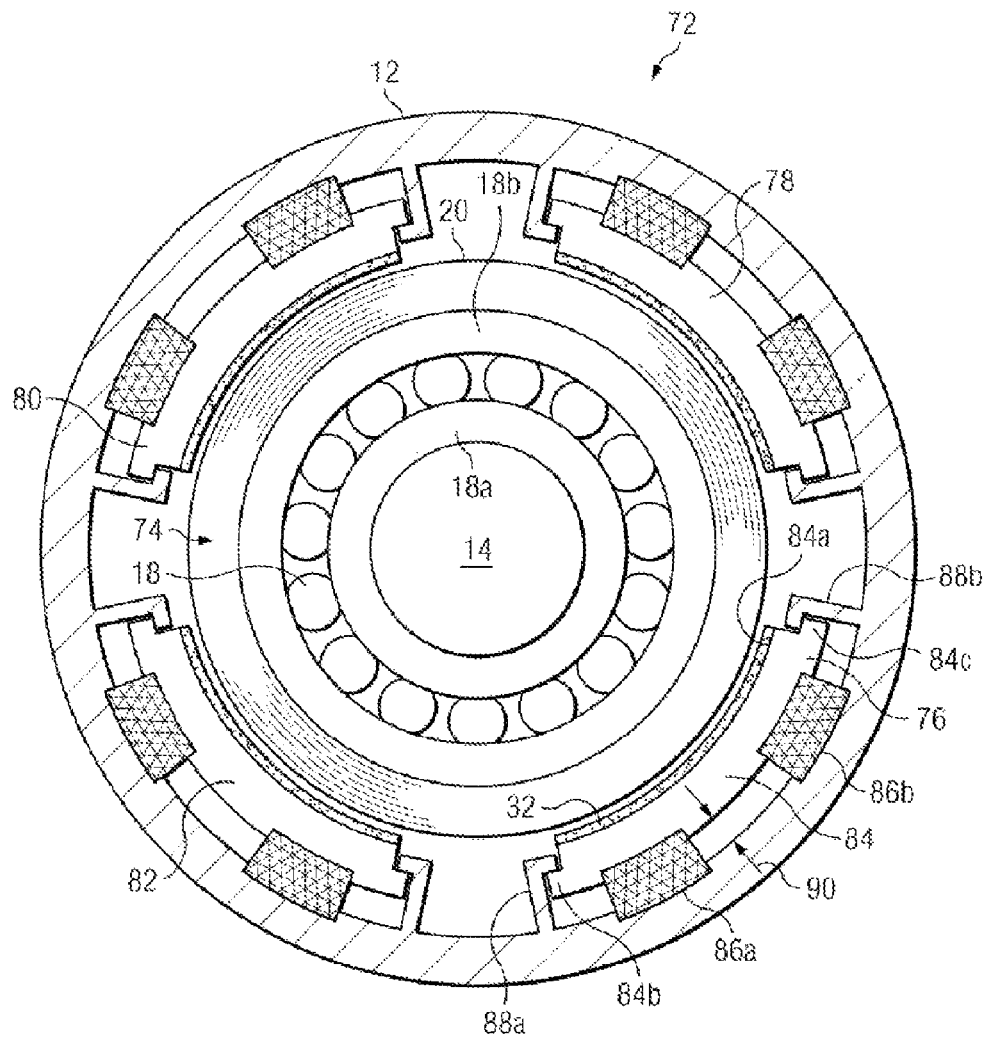
FIG. 4 is a sectional view of a still yet another rotor system according to an exemplary embodiment, the rotor system including a shaft and still yet another auxiliary bearing system.

In an exemplary embodiment, as illustrated in FIG. 4 with continuing reference to FIGS. 1-3, a rotor system is generally referred to by the reference numeral 72 and includes the casing 12, the shaft 14 and an auxiliary bearing system 74, which, in turn, includes the roller element bearing 18, the inertia ring 20, and circumferentially spaced mounting pad assemblies 76, 78, 80 and 82. The mounting pad assembly 76 includes an arcuate body member 84 defining an inner surface 84a on which the friction material 32 is disposed. In an exemplary embodiment, the inner surface 84a is coated with the friction material 32. Axially-extending shoulders 84b and 84c are formed on opposing circumferential end portions of the body member 84. The body member 84 is mounted on compliant inserts 86a and 86b, which extend between the casing 12 and the body member 84. The compliant inserts 86a and 86b have both stiffness and damping. In an exemplary embodiment, the compliant inserts 86a and 86b are knitted mesh metal inserts (as shown in FIG. 4), elastomer "button" inserts, shear mounts, and/or any combination thereof. In an exemplary embodiment, if the inserts 86a and 86b are knitted mesh metal inserts, the inserts 86a and 86b may be fabricated from knitted mesh material available from Metal Textiles Corporation or Stop-Choc. Generally L-shaped protrusions 88a and 88b extend from the inside surface of the casing 12 and the smaller legs of the protrusions 88a and 88b extend over the shoulders 84b and 84c, respectively, of the body member 84.

As shown in FIG. 4, the body member 84 is biased away from the inside surface of the casing 12 by the compliant inserts 86a and 86b and held in place by the L-shaped protrusions 88a and 88b, thereby preloading the body member 84 against the compliant inserts 86a and 86b and holding the body member 84 (and thus the friction material 32) radially away from the inertia ring 20. A gap 90 is defined between the body member 84 and the inside surface of the casing 12.

Each of the mounting pad assemblies 78, 80 and 82 is substantially identical to the mounting pad assembly 76 and therefore the mounting pad assemblies 78, 80 and 82 will not be described in further detail. The components of each of the mounting pad assemblies 78, 80 and 82 are given the same reference numerals as the corresponding components of the mounting pad assembly 76.

In several exemplary embodiments, in addition to the mounting pad assemblies 76, 78, 80 and 82, the auxiliary bearing system 74 may include one or more other mounting pad assemblies substantially identical to the mounting pad assembly 76. In several exemplary embodiments, one or more of the mounting pad assemblies 76, 78, 80 and 82 may be omitted from the auxiliary bearing system 74. In an exemplary embodiment, the auxiliary bearing system 74 may include only two of the mounting pad assemblies 76, 78, 80 and 82.

The operation of the rotor system 72, including the operation of its auxiliary bearing system 74, is similar to the above-described operation of the rotor system 10, including the above-described operation of its auxiliary bearing system 16, and therefore the operation of the rotor system 72 and the auxiliary bearing system 74 will not be described in detail. At least the compliant mounts provided by the respective engagements between the body members 84 and the corresponding inserts 86a and 86b, and/or the respective gaps 90, allow the body members 84 of the auxiliary bearing system 74 to move and/or pivot to best accommodate and/or distribute the applied load when one or more of the magnetic bearing systems normally supporting the rotating shaft 14 fail.

Figure 5A:
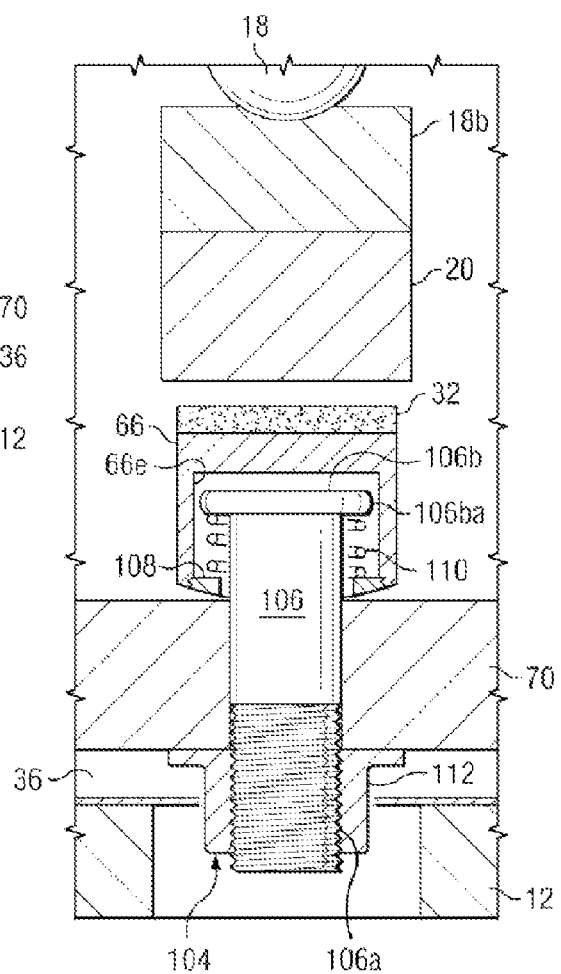
FIG. 5A is a partial sectional view of the rotor system of FIG. 5 taken along line 5A-5A.
Figure 5:
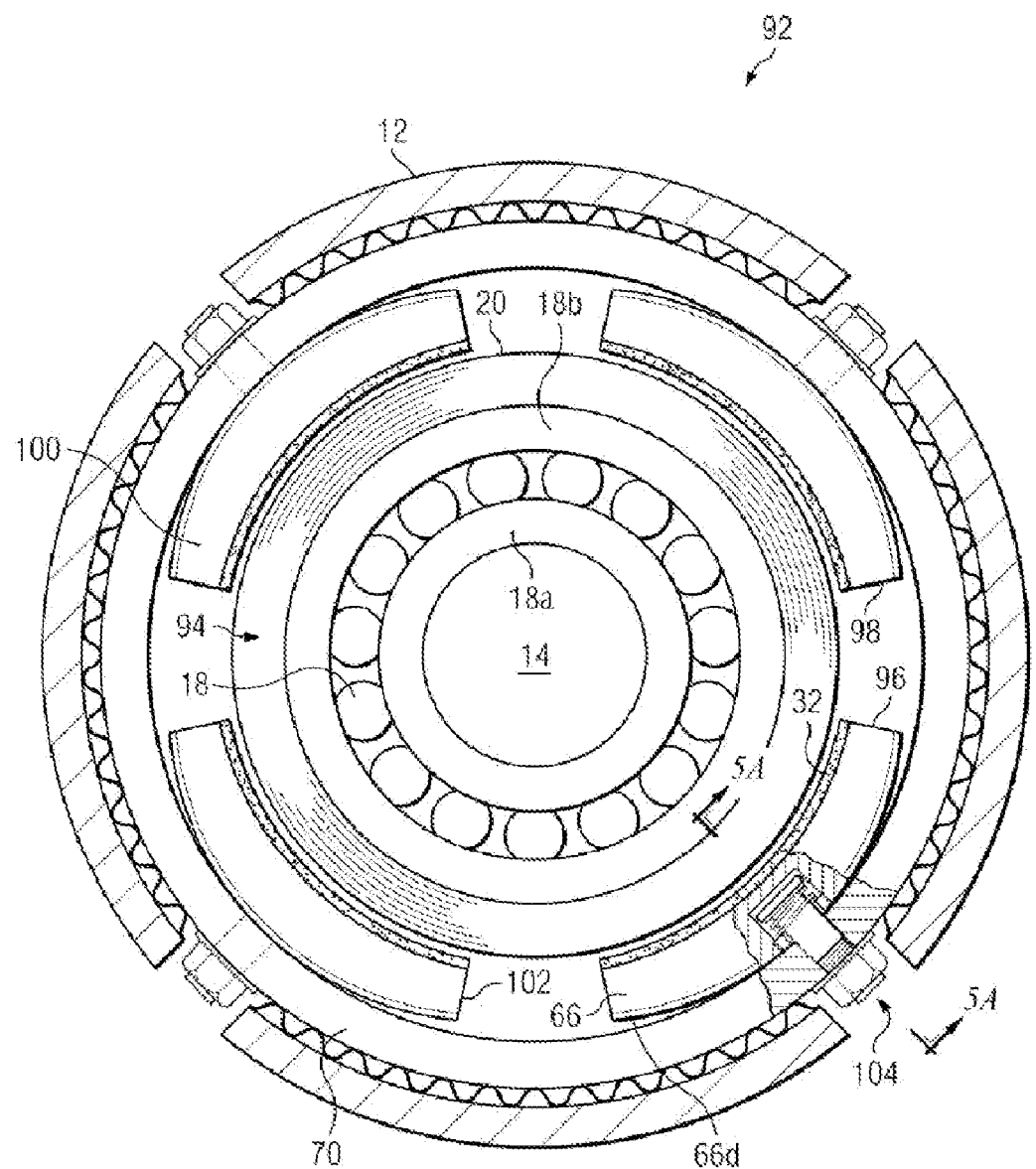
FIG. 5 is a sectional view of a still yet another rotor system according to an exemplary embodiment, the rotor system including a shaft and still yet another auxiliary bearing system.

In an exemplary embodiment, as illustrated in FIGS. 5 and 5A with continuing reference to FIGS. 1-4, a rotor system is generally referred to by the reference numeral 92 and includes an auxiliary bearing system 94, which contains several parts of the auxiliary bearing system 58, which are given the same reference numerals. The auxiliary bearing system 94 includes circumferentially-spaced mounting pad assemblies 96, 98, 100 and 102. The mounting pad assembly 96 is substantially similar to the mounting pad assembly 60, except that the openings 66b and 66c, and the pins 68a and 68b, are omitted in favor of an alternative retainment system 104, which retains the body member 66.

The retainment system 104 includes a post 106 having a threaded end portion 106a and a head end portion 106b opposed thereto, the head end portion 106b defining a circumferentially-extending crowned surface 106ba. A blind opening 66e is formed in the surface 66d of the body member 66, and the head end portion 106b extends within the opening 66e. A flat nut 108 is threadably engaged with an internal threaded connection formed in the inside surface of the body member 66 defined by the opening 66e. A spring 110 is disposed within the opening 66e so that the spring 110 extends between the head end portion 106b and the flat nut 108, and so that the post 106 extends through the spring 110. The post 106 is fastened to the outer surface of the housing 70 via a nut 112. The radial preload force on the body member 66 can be adjusted by changing the length of the post 106 (and therefore the amount of compression) and/or changing the spring 110 to include either a heavier or lighter spring or, in several exemplary embodiments, changing the spring 110 to be in the form of another device that provides a spring force such as, for example, a Belleville washer arrangement. The pivot point or location, that is, the location on the surface 66d that serves as the center of contact with the housing 70 for the unloaded mounting pad assembly 96, is illustrated in FIG. 3 to be at the circumferential center of the body member 66, circumferentially equidistant from the ends of the body member 60. However, in several exemplary embodiments, the pivot point may be located at a different circumferential point along the body member 66, either with or against the rotation of the shaft 14 from the circumferential center of the body member 66, as viewed in FIG. 3.

Each of the mounting pad assemblies 98, 100 and 102 is substantially identical to the mounting pad assembly 96 and therefore the mounting pad assemblies 98, 100 and 102 will not be described in further detail. The components of each of the mounting pad assemblies 98, 100 and 102 are given the same reference numerals as the corresponding components of the mounting pad assembly 96.

In several exemplary embodiments, in addition to the mounting pad assemblies 96, 98, 100 and 102, the auxiliary bearing system 94 may include one or more other mounting pad assemblies substantially identical to the mounting pad assembly 96. In several exemplary embodiments, one or more of the mounting pad assemblies 96, 98, 100 and 102 may be omitted from the auxiliary bearing system 94. In an exemplary embodiment, the auxiliary bearing system 94 may include only two of the mounting pad assemblies 96, 98, 100 and 102.

The operation of the rotor system 92, including the operation of its auxiliary bearing system 94, is similar to the above-described operation of the rotor system 10, including the above-described operation of its auxiliary bearing system 16, and therefore the operation of the rotor system 92 and the auxiliary bearing system 94 will not be described in detail. At least the compliant mount provided by the engagement between the housing 70 and the compliant member 36, and/or the rocking ability of the respective body members 66, allow the body members 66 of the auxiliary bearing system 94 to move and/or pivot to best accommodate and/or distribute the applied load when one or more of the magnetic bearing systems normally supporting the rotating shaft 14 fail. During operation, each of the crowned surfaces 106ba of the head end portion 106b prevents the respective body member 66 from being dragged by the inertia ring 20 during a drop or touch-down event.

Figure 6:
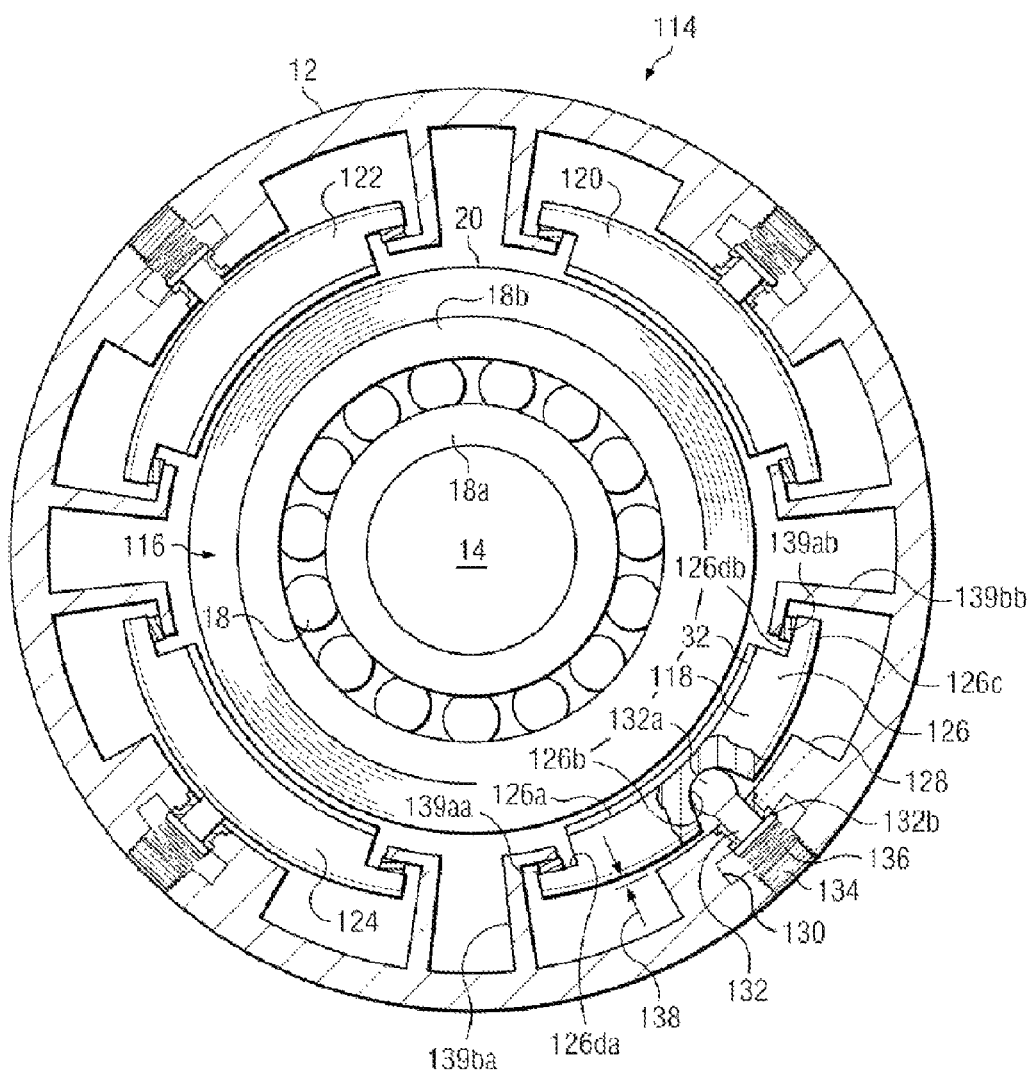
FIG. 6 is a sectional view of a still yet another rotor system according to an exemplary embodiment, the rotor system including a shaft and still yet another auxiliary bearing system.

In an exemplary embodiment, as illustrated in FIG. 6 with continuing reference to FIGS. 1-5A, a rotor system is generally referred to by the reference numeral 114 and includes the casing 12, the shaft 14 and an auxiliary bearing system 116, which, in turn, includes the roller element bearing 18, the inertia ring 20, and circumferentially spaced mounting pad assemblies 118, 120, 122 and 124. The mounting pad assembly 118 includes an arcuate body member 126 defining an inner surface 126a on which the friction material 32 is disposed. In an exemplary embodiment, the inner surface 126a is coated with the friction material 32. A socket 126b is formed in an outer surface 126c of the body member 126, the surface 126c being radially offset from the inner surface 126a. A protrusion 128 extends radially inward from the inside surface of the casing 12. A through opening 130 is formed through the casing 12 and the protrusion 128. A post 132 including a ball end portion 132a and an opposing flat head end portion 132b extends within the opening 130 so that the ball end portion 132a is engaged with the socket 126b. Due to this ball-and-socket engagement, the body member 126 is permitted to rock and/or rotate, relative to at least the casing 12. A plug 134 is threadably engaged with an internal threaded connection formed in the inside surface of the casing 12 defined by the opening 130. A spring 136 is disposed within the opening 130 and extends between the flat head end portion 132b of the post 132 and the plug 134. As a result of the engagement between the body member 126 and the post 132 and the engagement between the post 132 and the spring 136, the body member 126 is compliantly mounted. The plug 134 provides compression adjustment. A gap 138 is defined between the outer surface 126c of the body member 126 and the protrusion 128. Axially-extending shoulders 126da and 126db are formed on opposing circumferential end portions of the body member 126. Hold-down springs 139aa and 139ab are disposed on the shoulders 126da and 126db, respectively; in an exemplary embodiment, each of the hold-down springs 139aa and 139ab includes a wave spring. Generally L-shaped protrusions 139ba and 139bb extend from the inside surface of the casing 12 and the smaller legs of the protrusions 139ba and 139bb extend over, and engage, the hold-down springs 139aa and 139ab, respectively, thereby providing a radial retention mechanism or hold-down arrangement.

Each of the mounting pad assemblies 120, 122 and 124 is substantially identical to the mounting pad assembly 118 and therefore the mounting pad assemblies 120, 122 and 124 will not be described in further detail. The components of each of the mounting pad assemblies 120, 122 and 124 are given the same reference numerals as the corresponding components of the mounting pad assembly 118. The engagements between the L-shaped protrusions 139ba and 139bb and the hold-down springs 139aa and 139ab, respectively, keep the respective body members 126 of the mounting pad assemblies 120 and 124 from falling down onto the inertia ring 20, as viewed in FIG. 6.

In several exemplary embodiments, in addition to the mounting pad assemblies 118, 120, 122 and 124, the auxiliary bearing system 116 may include one or more other mounting pad assemblies substantially identical to the mounting pad assembly 118. In several exemplary embodiments, one or more of the mounting pad assemblies 118, 120, 122 and 124 may be omitted from the auxiliary bearing system 116. In an exemplary embodiment, the auxiliary bearing system 116 may include only two of the mounting pad assemblies 118, 120, 122 and 124.

The operation of the rotor system 114, including the operation of its auxiliary bearing system 116, is similar to the above-described operation of the rotor system 10, including the above-described operation of its auxiliary bearing system 16, and therefore the operation of the systems 114 and 116 will not be described in detail. At least the respective compliant mountings of the body members 126, the respective engagements of the ball end portions 132a with the corresponding sockets 126b, and/or the respective gaps 138, allow the body members 126 of the auxiliary bearing system 116 to move and/or pivot to best accommodate and/or distribute the applied load when one or more of the magnetic bearing systems normally supporting the rotating shaft 14 fail.

Figure 7:
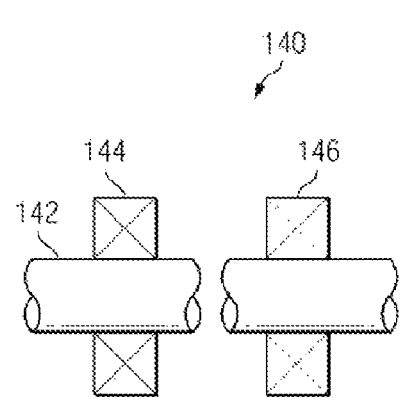
FIG. 7 is a diagrammatic view of still yet another rotor system according to an exemplary embodiment.
Figure 8:
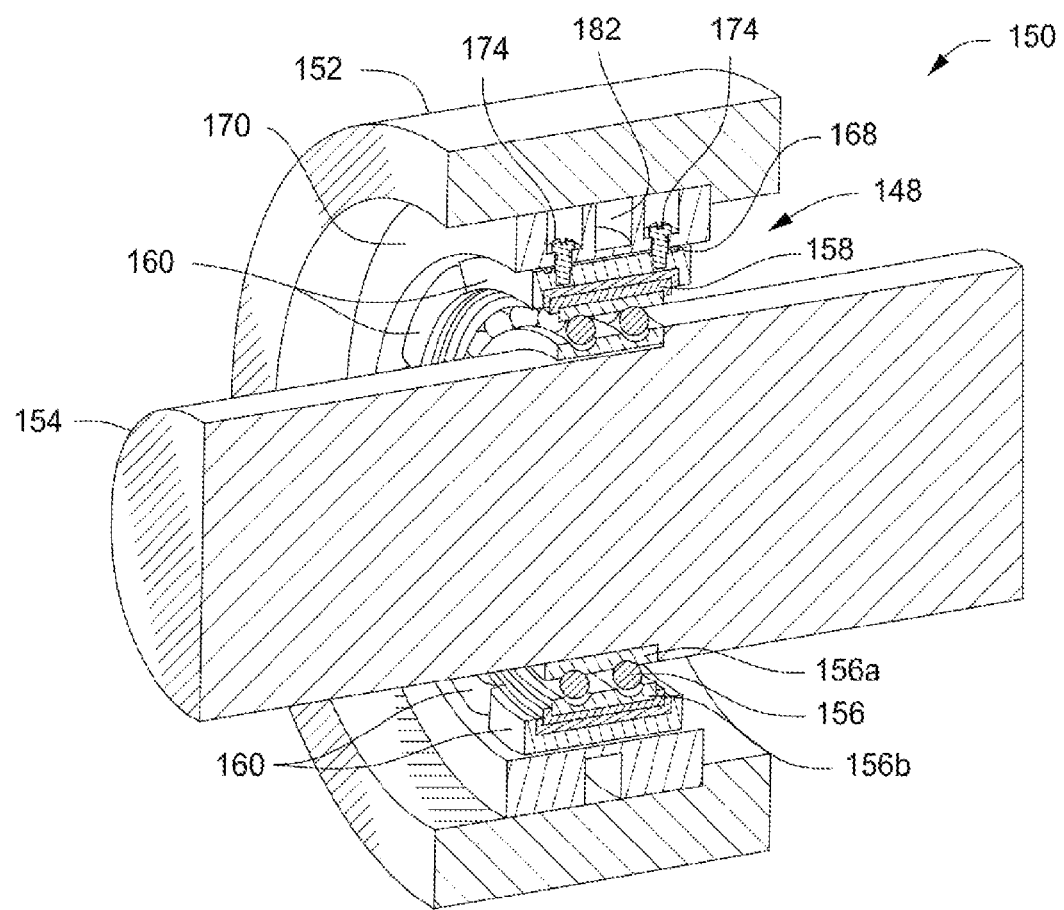
FIG. 8 is a perspective view of a section of still yet another rotor system according to an exemplary embodiment, the rotor system including a shaft and an auxiliary bearing system.
Figure 9:
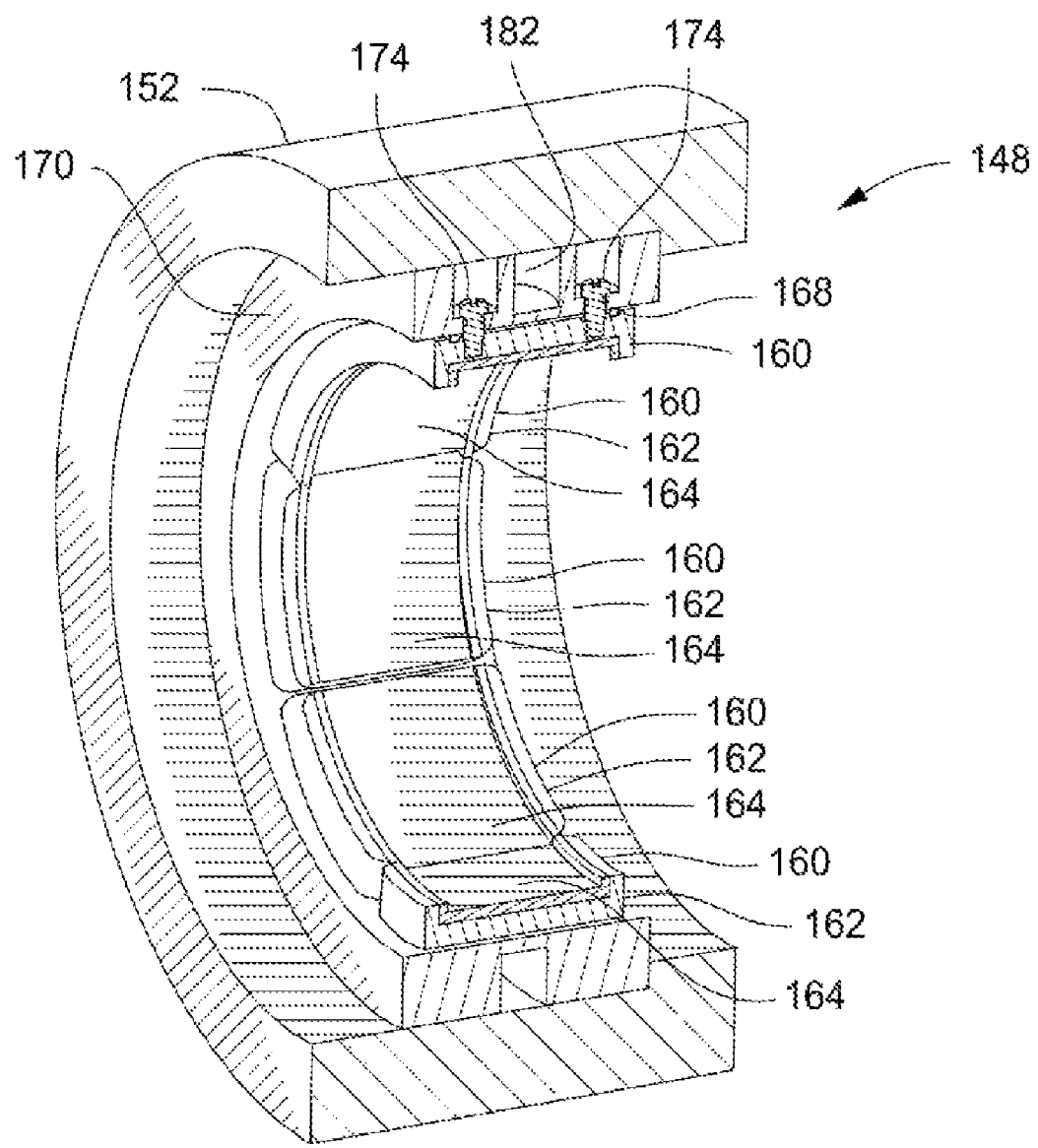
FIG. 9 is a perspective view of a section of a portion of the auxiliary bearing system of FIG. 8 according to an exemplary embodiment.
Figure 10:
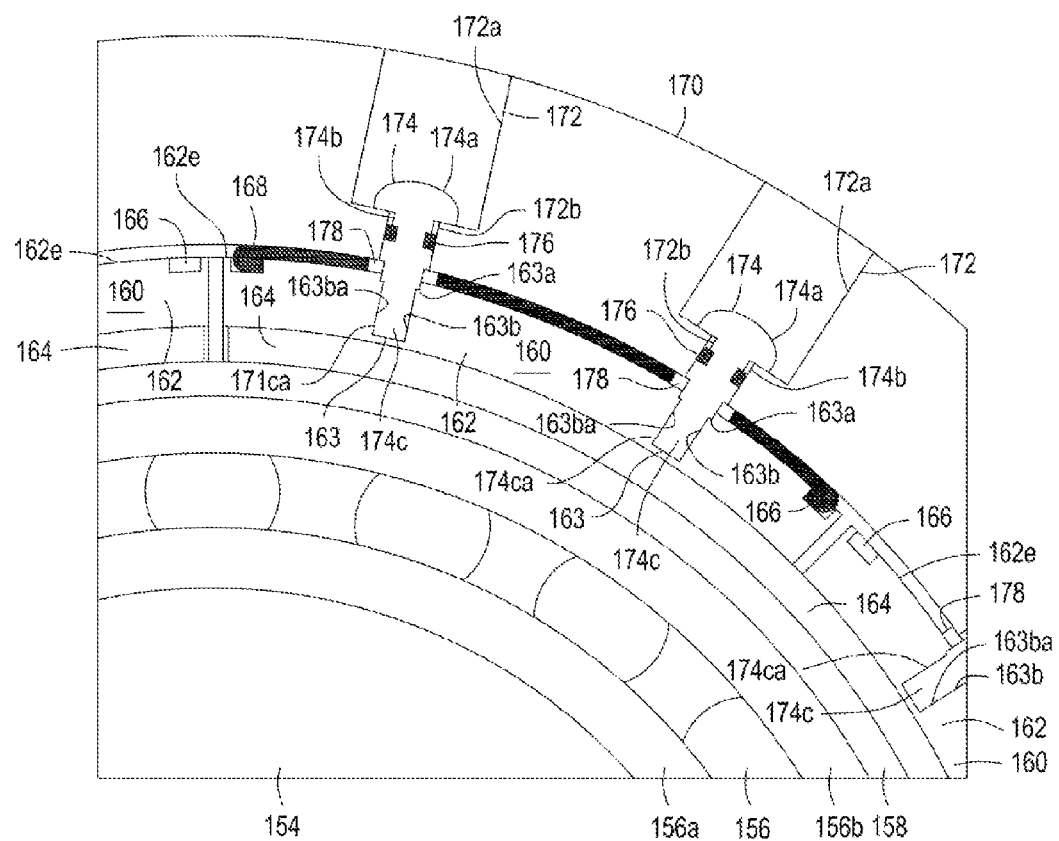
FIG. 10 is a sectional view of a portion of the auxiliary bearing system of FIGS. 8 and 9 according to an exemplary embodiment.
Figure 11:
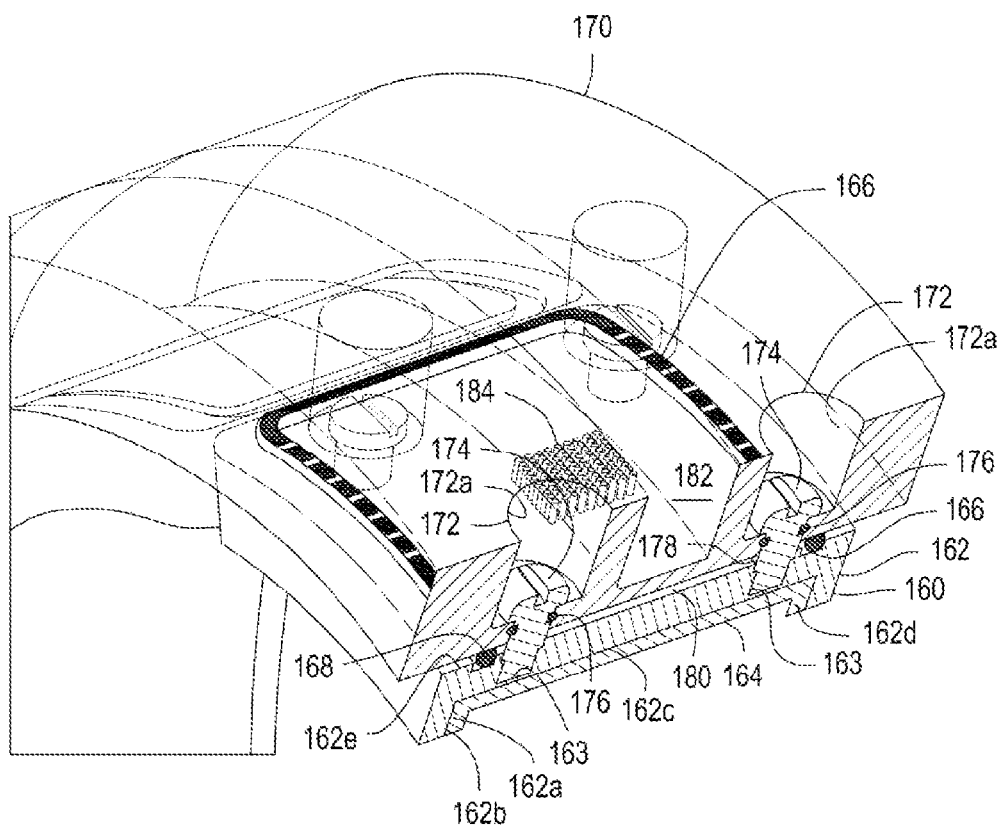
FIG. 11 is a perspective view of a section of a portion of the auxiliary bearing system of FIGS. 8-10 according to an exemplary embodiment.

In an exemplary embodiment, as illustrated in FIG. 7 with continuing reference to FIGS. 1-6, a rotor system is generally referred to by the reference numeral 140 and includes a shaft 142 and a magnetic bearing system 144, which is one of a plurality of magnetic bearing systems that normally support the shaft 142 and are positioned at axially-spaced locations along the shaft 142. The rotor system 140 further includes an auxiliary bearing system 146, which is one of a plurality of auxiliary bearing systems that are positioned at axially-spaced locations along the shaft 142. The auxiliary bearing system 146 supports the shaft 142 when the magnetic bearing system 144 fails. In several exemplary embodiments, the auxiliary bearing system 146 is the auxiliary bearing system 16, 42, 58, 74, 94 or 116, as described above, or an auxiliary bearing system 148, as described below and illustrated in FIGS. 8-12. In several exemplary embodiments, the rotor system 140 includes, or is part of, a turbomachine such as, for example, a compressor, turbine, motor or generator.

In an exemplary embodiment, as illustrated in FIGS. 8-12, a rotor system is generally referred to by the reference numeral 150 and includes a casing 152 and a shaft 154 at least partially disposed therein, the shaft 154 being normally supported by one or more active magnetic bearing systems positioned at one or more axially-spaced locations along the shaft 154 including, but not limited to, opposing end portions of the shaft 154. In several exemplary embodiments, the rotor system 150 includes, or is part of, a turbomachine such as, for example, a compressor, motor, generator or turbine. The rotor system 150 further includes the auxiliary bearing system 148, which includes a roller element bearing 156 having an inner bearing ring 156a through which the shaft 154 extends, and an outer bearing ring 156b. The inner bearing ring 156a is coupled to the shaft 154. An inertia ring 158 is coupled to the outer bearing ring 156b.

The auxiliary bearing system 148 further includes a plurality of circumferentially-spaced mounting pad assemblies 160, which are spaced about the inertia ring 158. Each of the mounting pad assemblies 160 includes an annular body member 162 that is, in several exemplary embodiments, nominally concentric with the shaft 154. Each of the body members 162 includes a U-shaped channel 162a, which defines inner surfaces 162b, 162c and 162d. Each of the body members 162 defines an outer surface 162e, which is radially offset from the inner surface 162c. A plurality of blind counterbores 163 are formed in the outer surface 162e of each of the body members 162, each of the counterbores 163 including an enlarged diameter portion 163a and a reduced diameter portion 163b having an internal threaded connection 163ba.

A pad of sacrificial friction material 164 is disposed on, and coupled to, the inner surfaces 162b, 162c and 162d of each of the body members 162. In an exemplary embodiment, the inner surfaces 162b, 162c and 162d are coated with the friction material 164. In an exemplary embodiment, the pad of friction material 164 is coupled to the inside surfaces 162b, 162c and 162d of each of the body members 162 via one or more adhesives, rivets, screws, other fastening systems, and/or any combination thereof. In an exemplary embodiment, the friction material 164 is made from a material having capabilities that are similar to the capabilities of clutch facing material. In an exemplary embodiment, the friction material 164 is a Kevlar fiber matrix. Under conditions to be described below, the friction material 164 is adapted to engage the inertia ring 158, the outer surface of which, in several exemplary embodiments, is made of a material that provides an appropriate abrasion resistant tribologic pair with the friction material 164 such as, for example, cast iron or steel.

A channel 166 is formed in the outer surface 162e of each of the body members 162, and extends generally along the perimeter of the body member 162. A sealing element such as an o-ring 168 is disposed in each of the channels 166. A casing or housing 170 is coupled to the inside surface of the casing 152, and is also coupled to the respective body members 162 of the mounting pad assemblies 160. For each of the body members 162, a plurality of counterbores 172 are formed through the housing 170, each of the counterbores 172 having an enlarged diameter portion 172a and a reduced diameter portion 172b, and being aligned with a respective one of the counterbores 163 formed in the body member 162.

Each of the body members 162 is compliantly mounted to the housing 170. More particularly, a plurality of fasteners 174 extend through the counterbores 172 and into the counterbores 163, respectively. Each of the fasteners 174 includes a head 174a and an enlarged diameter portion 174b extending therefrom, and a reduced diameter portion 174c extending from the enlarged diameter portion 174b, the reduced diameter portion 174c including an external threaded connection 174ca. For each of the fasteners 174, the head 174a engages an internal shoulder of the housing 170 defined by the enlarged diameter portion 172a of a respective one of the counterbores 172, the enlarged diameter portion 174b extends through the reduced diameter portion 172b, the end of the enlarged diameter portion 174b engages an internal shoulder of the body member 162 defined by the enlarged diameter portion 163a of a respective one of the counterbores 163, the reduced diameter portion 174c extends into the reduced diameter portion 163b, and the external threaded connection 174c a engages the internal threaded connection 163ba, thereby coupling the body member 162 to the housing 170. As a result of the respective extensions of the fasteners 174 through the counterbores 172 and into the counterbores 163 and the resulting coupling of the body member 162 to the housing 170, the o-ring 168 is compressed and thus sealingly engages the inside surface of the housing 170 and the outside surface 162e of the body member 162. An o-ring 176 extends in an annular channel formed in the outside surface of the enlarged diameter portion 174b of each of the fasteners 174, the o-ring sealingly engaging the inside wall of the housing 170 defined by the reduced diameter portion 172b of the respective counterbore 172. In an exemplary embodiment, an annular element 178 extends about the enlarged diameter portion 174b of each of the fasteners 174, and is positioned between the inside surface of the housing 170 and the outer surface 162e of the body member 162. In an exemplary embodiment, the annular elements 178 are compressed between the body member 162 and the housing 170. The coupling of the housing 170 to the body member 162 via the fasteners 174, the compression of the o-ring 168, the positioning of the annular elements 178 between the housing 170 and the body member 162, and/or any combination thereof, provides a compliant mount for the body member 162. In several exemplary embodiments, instead of, or in addition to employing the fasteners 174 and/or the annular elements 178, each of the body members 162 may be compliantly mounted to the housing 170 with one or more of the compliant mounts described above and illustrated in FIGS. 1-6.

As a result of the above-described coupling of each of the body members 162 to the housing 170, a cavity 180 is defined radially between the surface 162e of each of the body members 162 and the inside surface of the housing 170, and is further defined by the respective o-ring 168. An axisymmetric annulus 182 is formed in the housing 170. Each of the cavities 180 is fluidically coupled to the annulus 182 via a porous fluid communication path 184. In an exemplary embodiment, each of the porous fluid communication paths 184 is a series of small through-holes, a matrix of porous media, and/or any combination thereof. The cavities 180 are filled with a fluid such as, for example, lubricating oil, which is also disposed in the annulus 182, which serves as a common fluid reservoir for all of the cavities 180 in the auxiliary bearing system 148. A pressure compensation device 186 is fluidically and/or otherwise operably coupled to the annulus 182, and is capable of adjusting and maintaining the fluid content and pressure within the annulus 182, the fluid communication paths 184, and the cavities 180. In an exemplary embodiment, the pressure compensation device 186 includes one or more bellows, piston/spring systems, remote sources of pressurized fluid, and/or any combination thereof.

In operation, in an exemplary embodiment with continuing reference to FIGS. 8-12, the shaft 154 rotates in place during the operation of the rotor system 150, and is normally supported by one or more magnetic bearing systems positioned at one or more axially-spaced locations along the shaft 154 including, but not limited, opposing end portions of the shaft 154. During the rotation of the shaft 154 and its normal support by the active magnetic bearing systems, a radial clearance or gap is defined between the inertia ring 158 and the pads of the friction material 164. The shaft 154 is levitated, relative to the casing 152, the housing 170 and the mounting pad assemblies 160, by the one or more active magnetic bearing systems, and the shaft 154, the roller element bearing 156 including the rings 156a and 156b, and the inertia ring 158 all rotate relative to the casing 152, the housing 170 and the mounting pad assemblies 160, all of which are generally stationary. The auxiliary bearing system 148 does not support the shaft 154 during the normal operation of the rotor system 150, that is, when the active magnetic bearing systems are supporting the shaft 154. However, since the inner ring 156a of the roller element bearing 156 is coupled to the shaft 154, the roller element bearing 156 and the inertia ring 158 rotate or spin in place along with the shaft 154 during the normal operation of the rotor system 150.

When one or more of the magnetic bearing systems—which normally support the shaft 154—fail, the shaft 154 delevitates so that the inertia ring 158 engages or drops onto one or more of the mounting pad assemblies 160, at which point the auxiliary bearing system 148 begins to at least partially support the spinning shaft 154, with the roller element bearing 156 being subjected to, and accommodating, at least a radial load. The mass of the inertia ring 158 is added to the outer bearing ring 156b and therefore slows the rate of deceleration of the outer bearing ring 156b during the drop event. Upon engagement with one or more of the mounting pad assemblies 160, the inertia ring 158 contacts the respective pads of the friction material 164, which regulate the slowdown of the inertia ring 158 and prevent damage to the engaging surfaces of the inertia ring 158 and the respective body members 162. Due to the compliant mounting of the respective body members 162, the mounting pad assemblies 160 absorb impact loads due to the drop of the shaft 154 and provide prescribed amounts of stiffness and damping to the auxiliary bearing system 148, thereby facilitating vibration control of the shaft 154 when traversing critical speeds during coastdown. The controlled deceleration of the components of the auxiliary bearing system 148, including the roller element bearing 156 and the inertia ring 158, allow the auxiliary bearing system 148 to tolerate an increased number of drop events of the shaft 154. Moreover, there are no unlubricated moving contacts once the transient motion associated with a drop event has ceased. In an exemplary embodiment, if the shaft 154 delevitates and engages two or more of the mounting pad assemblies 160, the shaft 154 is supported at two or more discrete points, thereby minimizing any tendency for the shaft 154 to whirl.

During the engagement of the inertia ring 158 with at least one of the mounting pad assemblies 160, the above-described compliant mounting of the respective body member 162 to the housing 170 allows the body member 162 to move and/or pivot to best accommodate the applied load. For example, the body member 162 or a portion thereof may move by pivoting about, for example, an axis that is generally parallel to the shaft 154, and/or translating radially, axially, circumferentially, and/or any combination thereof. Similarly, during the engagement of the inertia ring 158 with two or more of the mounting pad assemblies 160, the above-described compliant mounting of the respective body members 162 to the housing 170 allow the respective body members 162 to move by pivoting and/or translating to best accommodate the applied load, and to distribute the load among the mounting pad assemblies 160. As a result, two or more of the mounting pad assemblies 160 cradle the mass of the inertia ring 158 and share the load.

Since the respective body members 162 of the mounting pad assemblies 160 are compliantly mounted to the housing 170 and the body members 162 have some degree of movement to better support the load(s) on them, the mounting pad assemblies 160 support the shaft 154 in a stable position if, as a result of the failure of one or more of the magnetic bearing systems and the delevitation of the shaft 154, one or more loads are in line with one or more of the respective body members 162 and/or if one or more loads are between adjacent ones of the respective body members 162.

Before, during or after the engagement of the inertia ring 158 with at least one of the mounting pad assemblies 160, and when the respective body member 162 moves at least radially outwardly towards the housing 170 in response to the engagement and/or subsequent disengagement, at least a portion of the fluid in the respective cavity 180 is driven out of the cavity 180 and flows into the annulus 182 via the respective porous communication path 184. More particularly, the pad of friction material 164, the body member 162 and the corresponding fasteners 174 move at least radially outwardly towards the housing 170, reducing the radial dimension of the cavity 180, that is, the radial spacing between the surface 162e of the body member 162 and the inside surface of the housing 170, thereby driving at least a portion of the fluid in the cavity 180 through the porous communication path 184 and into the annulus 182. The porous communication path 184 provides linear, or nearly linear, damping when the fluid is driven out of or into the cavity 180.

Before, during or after the engagement of the inertia ring 158 with at least one of the mounting pad assemblies 160, and when the respective body member 162 moves at least radially inwardly away from the housing 170 in response to the engagement and/or subsequent disengagement, at least a portion of the fluid in the annulus 182 is drawn into the cavity 180 via the respective porous communication path 184. More particularly, the pad of friction material 164, the body member 162 and the corresponding fasteners 174 move at least radially inwardly away from the housing 170, increasing the radial dimension of the cavity 180, that is, the radial spacing between the surface 162e of the body member 162 and the inside surface of the housing 170, thereby drawing at least a portion of the fluid in the annulus 182 through the porous communication path 184 and into the cavity 180. The porous communication path 184 provides linear, or nearly linear, damping when the fluid is drawn into the cavity 180.

Figure 12:
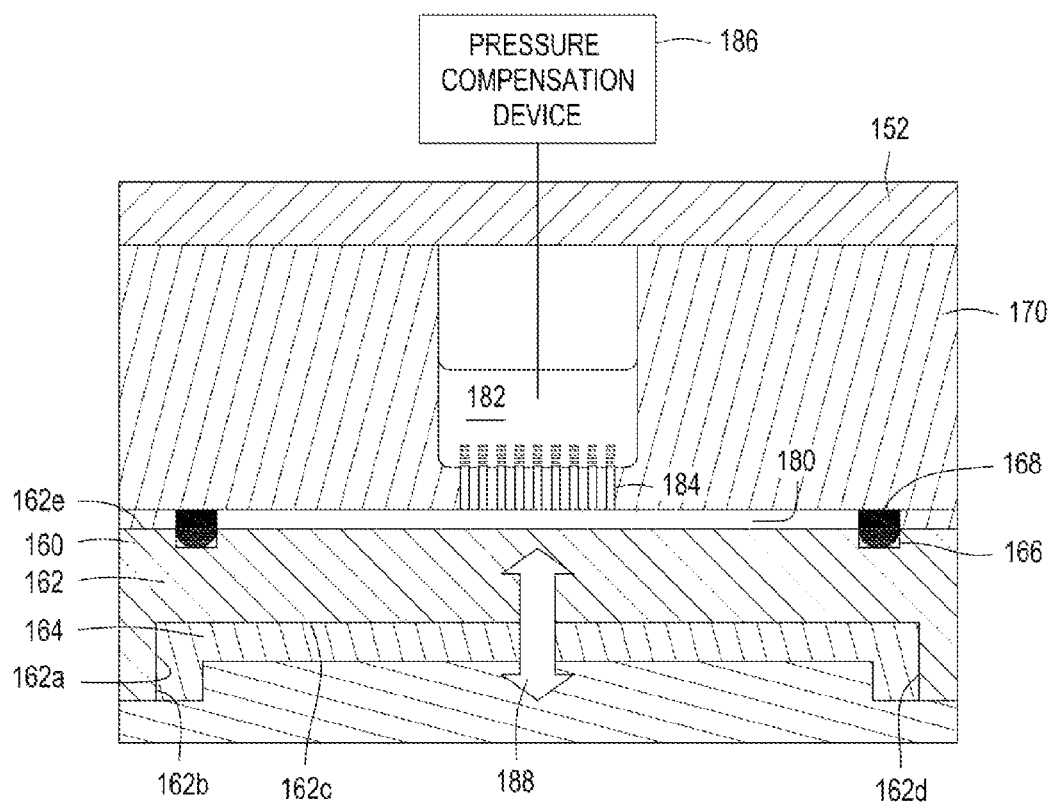
FIG. 12 is a partial diagrammatic view/partial sectional view of a portion of the auxiliary bearing system of FIGS. 9-11 according to an exemplary embodiment.

The respective porous fluid communication paths 184 of the mounting pad assemblies 160 provide linear, or nearly linear, damping when fluid is driven out of, or drawn into, the respective cavities 180 via the porous fluid communication paths 184 over a large range of fluid flow, with the fluid flow being driven by the respective radial movements of the body members 162 of the mounting pad assemblies 160, relative to the housing 170, as indicated by an arrow 188 in FIG. 12, and with the pressure compensation device 186 maintaining the fluid content and pressure within the annulus 182, the fluid communication paths 184, and the cavities 180. As a result, the auxiliary bearing system 148 permits the pads of the friction material 164 to comply with the excursions of the shaft 154, during or after the drop event, while actively damping out vibration. As discussed above, linear, or nearly linear, damping is provided due to the porous fluid communication paths 184.

In several exemplary embodiments, during the operation of the auxiliary bearing system 148, the fluid in the cavities 184 facilitate thermal contact with at least the housing 170, thereby enhancing heat dissipation. In several exemplary embodiments, the fluid in the cavities 184 may be fluidically and/or otherwise coupled to an active liquid cooling system to further augment heat dissipation from the pads of the friction material 164.

Figure 13:
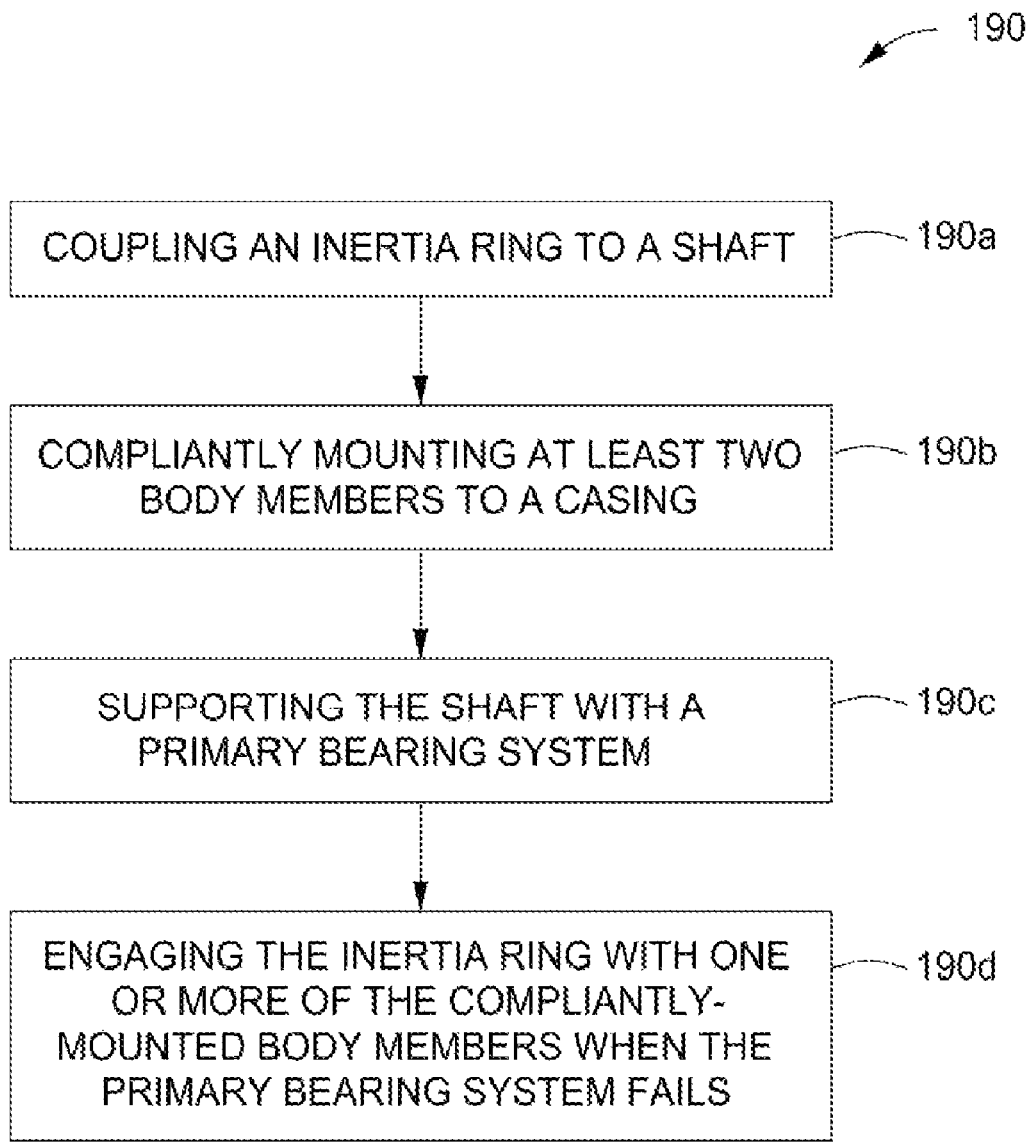
FIG. 13 is a flow chart illustration of a method of supporting a shaft, according to an exemplary embodiment.

In an exemplary embodiment, as illustrated in FIG. 13, a method of supporting a shaft is generally referred to by the reference numeral 190 and includes coupling an inertia ring to the shaft wherein the shaft is at least partially disposed in a casing in step 190a; compliantly mounting at least two body members to the casing so that each of the body members is permitted to move relative to the casing and the other body members in step 190b; supporting the shaft with a primary bearing system in step 190c; and engaging the inertia ring with one or more of the compliantly-mounted body members when the primary bearing system fails in step 190d.

Although the present disclosure has described embodiments relating to specific turbomachinery, it is understood that the apparatus, systems and methods described herein could applied to other environments. For example, according to another exemplary embodiment, rotating machinery that is driven by a turbomachine may be configured to use embodiments of the auxiliary bearing systems described above.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An auxiliary bearing system, comprising:
   at least two mounting pad assemblies, each mounting pad assembly comprising a body member compliantly mounted to a casing and permitted to move relative to the casing and the respective body members of the other mounting pad assemblies of the at least two mounting pad assemblies; and
   an inertia ring coupled to a shaft, the inertia ring engaging one or more of the at least two mounting pad assemblies only when the shaft is supported by the auxiliary bearing system.

2. The auxiliary bearing system of claim 1, further comprising:
   a compliant member engaged with a circumferentially-extending inside surface of the casing, wherein each of the body members is engaged with the compliant member so that the compliant member is radially disposed between the inside surface of the casing and the body members.

3. The auxiliary bearing system of claim 1, wherein each of the at least two mounting pad assemblies further comprises:
   at least one curved beam support, comprising:
      a base coupled to the casing; and a protrusion extending from the base and engaged with the corresponding body member so that a gap is defined between the base and the corresponding body member.

4. The auxiliary bearing system of claim 1, further comprising:
a housing extending circumferentially around the body members, wherein each of the body members is engaged with the housing; and
a compliant member engaged with the casing and the housing so that the compliant member is radially disposed between the housing and a circumferentially-extending inside surface of the casing.

5. The auxiliary bearing system of claim 1, wherein each of the at least two mounting pad assemblies further comprises:
a compliant insert on which the corresponding body member is mounted, wherein the compliant insert extends between the casing and the corresponding body member and the corresponding body member is biased away from a circumferentially-extending inside surface of the casing by the compliant insert, and wherein a gap is defined between the inside surface of the casing and the corresponding body member.

6. The auxiliary bearing system of claim 1, wherein each of the at least two mounting pad assemblies further comprises:
a socket formed in the corresponding body member;
a plug engaged with the casing;
a post having a ball portion engaged with the socket of the corresponding body member; and
a spring extending between the plug and the post.

7. The auxiliary bearing system of claim 1, further comprising:
a housing coupled to the casing and extending circumferentially around the body members, wherein an annulus is formed in the housing and a fluid is disposed in the annulus, and wherein a cavity is defined by at least the housing and the corresponding body member and the cavity is fluidically coupled to the annulus.

8. The auxiliary bearing system of claim 7, further comprising:
a pressure compensation device operably coupled to the annulus and capable of adjusting the pressure of the fluid in the annulus, wherein each of the cavities is fluidically coupled to the annulus via a porous fluid communication path.

9. The auxiliary bearing system of claim 1, further comprising:
a roller element bearing comprising:
an inner ring coupled to the shaft; and
an outer ring coupled to the inertia ring; and
a friction material disposed on an inner surface of each of the body members, wherein, when the shaft is supported by a primary bearing system, a radial clearance is defined between the inertia ring and the friction material of each of the at least two mounting pad assemblies.

10. A method of supporting a shaft, the method comprising:
coupling an inertia ring to the shaft, wherein the shaft is at least partially disposed in a casing;
compliantly mounting at least two body members to the casing so that each of the at least two body members is permitted to move relative to the casing and the other body members of the at least two body members;
supporting the shaft with a primary bearing system; and
engaging the inertia ring with one or more of the compliantly-mounted at least two body members when the primary bearing system fails.

11. The method of claim 10, wherein compliantly mounting the at least two body members to the casing comprises:
engaging a compliant member with the casing; and
engaging each of the at least two body members with the compliant member so that the compliant member is disposed between a circumferentially-extending inside surface of the casing and the at least two body members.

12. The method of claim 10, wherein compliantly mounting the at least two body members to the casing comprises:
coupling a plurality of curved beam supports to the casing; and
engaging each of the at least two body members with at least one of the curved beam supports.

13. The method of claim 10, wherein compliantly mounting the at least two body members to the casing comprises:
extending a housing circumferentially around the at least two body members, wherein each of the at least two body members is engaged with the housing; and
engaging a compliant member with the casing and the housing so that the compliant member is disposed between the housing and a circumferentially-extending inside surface of the casing.

14. The method of claim 10, wherein compliantly mounting the at least two body members to the casing comprises:
mounting each of the at least two body members to a compliant insert that extends between the casing and the body member of the at least two body members, wherein a gap is defined between a circumferentially-extending inside surface of the casing and the body member, and the body member is biased away from the inside surface of the casing by the compliant insert.

15. The method of claim 10, wherein compliantly mounting the at least two body members to the casing comprises:
forming a socket in each of the at least two body members;
engaging each of the sockets with a ball portion of a respective post; and
extending a spring between each of the posts and a respective plug engaged with the casing.

16. The method of claim 10, wherein compliantly mounting the at least two body members to the casing comprises:
coupling a housing to the casing so that the housing extends circumferentially around the at least two body members;
forming an annulus in the housing;
filling the annulus with a fluid; and
fluidically coupling a plurality of cavities to the annulus, each of the cavities being defined by at least the housing and one of the at least two body members.

17. The method of claim 16, further comprising:
operably coupling a pressure compensation device to the annulus, wherein each of the cavities is fluidically coupled to the annulus via a porous fluid communication path.

18. The method of claim 10, wherein coupling the inertia ring to the shaft comprises:
coupling an inner ring of a roller element bearing to the shaft; and
coupling an outer ring of the roller element bearing to the inertia ring;
wherein each of the at least two body members defines an inner surface on which friction material is disposed; and
wherein, when the shaft is supported by the primary bearing system, a radial clearance is defined between the inertia ring and the friction material of each of the at least two body members.

19. A rotor system, comprising:
a shaft;

a primary bearing system that supports the shaft during normal operating conditions; and an auxiliary bearing system that supports the shaft when the primary bearing system fails, the auxiliary bearing system comprising:
- an inner ring of a roller element bearing coupled to the shaft;
- an outer ring of the roller element bearing disposed radially outward from the inner ring;
- an inertia ring coupled to the outer ring;
- at least two mounting pad assemblies disposed radially outward from the inertia ring, wherein a radial gap is defined between the inertia ring and an inner surface of each of the at least two mounting pad assemblies when the primary bearing system is supporting the shaft; and
- a casing to which each of the at least two mounting pad assemblies is compliantly mounted.

20. The rotor system of claim 19, further comprising:
a friction material disposed on the inner surface of each of the at least two mounting pad assemblies.

* * * * *